Patented Mar. 20, 1945

2,371,768

UNITED STATES PATENT OFFICE 2,371,768

METHOD OF PREPARING HIGH BUTYRYL CELLULOSE ESTERS STABILIZED AGAINST DISCOLORATION

Carl J. Malm and Martin Salo, Rochester, N. Y., assignors to Eastman Kodak Company, Rochester, N. Y., a corporation of New Jersey No Drawing. Application March 17, 1942, Serial No. 435,072

10 Claims. (Cl. 106—186)

This application relates to a method of stabilizing cellulose esters having a high butyryl content against discloration when subjected to an elevated temperature.

There are various purposes for which high butyryl esters of cellulose have been suggested which involve softening or melting the esters by means of heat. For instance, in making molding compositions, it is often desirable to incorporate plasticizer, pigment or other additional materials into the cellulose ester by working up the mass upon hot rolls which causes softening of the ester. This molding composition is again subjected to heating when molded or heat-formed products are prepared therefrom.

In forming coatings by melting a mixture of a high butyryl cellulose ester and a plasticizer and applying it to a surface, as described and claimed in our application Serial No. 275,484, usually the cellulose ester is in a melted condition for a considerable period of time. It is highly important in an operation such as this that the cellulose ester be resistant to discoloration by heat.

An object of this invention is to prepare high butyryl cellulose esters which are stabilized against discoloration by heat so that they may be employed in processes in which elevated temperatures are employed. Other objects of our invention will appear herein.

We have found that by incorporating certain alcohol amines in compositions containing high butyryl cellulose esters, which have previously been treated with an alkaline magnesium compound, that the resulting product resists discoloration for a much longer period when subjected to severe heat than an ester in which no alcohol amine or similar stabilizing agent has been incorporated. It is necessary that sodium compounds be substantially absent from the composition to which the heat is applied as otherwise the alcohol amine does not inhibit the discoloration.

The esters to which this invention applies are those which contain at least 25% of butyryl. The making of esters of this type is described in previous specifications. For instance, Malm and Kirton Patent No. 2,250,201 describes the making of a high butyryl cellulose ester. It is important in making the ester which is to be stabilized by this invention that no sodium compounds are employed anywhere in the process, whereby a sodium residue remains in the cellulose ester. Also, it is necessary that a residue of magnesium or calcium be present in the product which is mixed with the alcohol amine.

In its broadest aspect, our invention comprises thoroughly mixing with the cellulose ester an alcohol amine which will enhance the heat-resisting properties of the cellulose ester. For instance, a cellulose ester, having a high butyryl content, is mixed with a small amount of an ethanolamine, such as 0.1-1%, based on the weight of the ester and, if desired, some plasticizer. If the cellulose ester is not already in comminuted condition, the mixture is subjected to a comminuting process, such as grinding in a ball mill. A composition is thereby formed which can be subjected to heat treatment. For instance, the mass can be run over hot rolls, such as are employed in preparing some thermoplastic compositions. Instead of this, however, the comminuted mixture of cellulose ester, plasticizer and ethanolamine can be made up into a molding powder which is, of course, subjected to heat in forming products therefrom. It is desirable, after the alcohol amine has been mixed with the cellulose ester, to avoid contacting the composition with water, as these compounds are water soluble and will be lost from a composition by a washing operation.

The alcohol amines, which we have found to be suitable for improving the heat stability of high butyryl cellulose ester, are triethanolamine, triiso-propanolamine, 2 - amino - 2 - methyl-1-propanol, 2-amino-2-methyl 1-3 propanediol, the diethanolamines and the glycerolamines, such as dimethyl amino glycerol and those marketed under the trade name Trigimene. These alcohol amines are preferably employed in pure condition, although there are many substances, in which the suitable alcohol amines are present in a considerable amount, which may be employed for use in our invention. For instance, the material known as mixed iso-propanolamine in which ordinary tri-iso-propanolamine predominates can very well be employed to improve the heat-resisting properties of the cellulose ester composition. Under the term "diethanolamines" are included also the mixed alkyl-alcoholic amines such as butyl diethanolamine as well as the compound ordinarily referred to as diethanolamine.

The cellulose esters, which have been found to be suitable for forming heat-resistant materials, in accordance with our invention, are the butyric acid esters of cellulose having a butyryl content of at least 25%. For instance, a cellulose acetate butyrate, having a butyryl content of approximately 37%, is well suited for preparing a composition in accordance with our invention. Also, a cellulose tributyrate or a hydrolyzed cellulose butyrate may also be employed in making a composition of this nature. As pointed out above, the esters employed in our invention should have been given some treatment with a magnesium or calcium salt during their preparation, washing or refining. For instance, an ester in which an alkaline magnesium salt, such as magnesium carbonate, was added to the wash water, particularly to the final wash water, would be suitable for use in our composition. The final wash, however, instead of being with a magnesium salt might have present in solution a small proportion of an alkaline calcium compound, such as calcium hydroxide or calcium carbonate. Other ways in which magnesium or calcium salts may be added to the cellulose ester is by boiling it with water having a pH of 7.2 to 8.5, the elevated pH having been supplied by magnesium carbonate. Another method by which magnesium or calcium residue might be incorporated in the cellulose ester is by neutralizing part of the sulfuric acid in the cellulose ester reaction mixture, with a magnesium or calcium compound, before the hydrolysis occurs, as described and claimed in U. S. Patent No. 2,259,462 of Fletcher or by partially or completely neutralizing the catalyst remaining after hydrolysis with an alkaline magnesium or calcium compound. Another method by which a magnesium or calcium residue may be incorporated in the cellulose ester is by treating it in accordance with the invention described and claimed in Malm and Crane application Serial No. 382,584. It is important that throughout the preparation of the cellulose ester, the cellulose material or the cellulose ester is not contacted with sodium compounds and that wherever the use of an alkaline compound is called for, some non-alkali metal compound, which will serve the purpose, is employed. The most useful compounds for this purpose are those of the "A" division of group 2 of the periodic table which includes magnesium, calcium, strontium and barium, particularly the water-soluble alkaline compounds of those elements.

The compositions, resulting from our invention, are suitable in any case where heat is employed in their working. For instance, they are quite suitable for use in molding composition. Also, they are suitable for use in molten coating processes of the type described in our application Serial No. 275,484, filed May 24, 1939.

The plasticizers, which may be employed with the cellulose esters treated in accordance with our invention, may be of any of the usual plasticizers employed in this connection, such as dibutyl sebacate, di-2-ethyl hexyl sebacate, di-2-ethyl hexyl phthalate, dibutyl phthalate or diamyl phthalate or a mixture of any of these with triphenyl or tricresyl phosphate. Other plasticizers, which may be employed, are those disclosed in our application Serial No. 275,484 or those listed in U. S. Patent No. 2,261,140 of Conklin and Malm relating to thermoplastic molding compositions.

The following example illustrates our invention:

*Example I*

A composition was prepared consisting of 28 grams of cellulose acetate butyrate, having a butyryl content of approximately 37% and containing a magnesium residue, 12 grams of dibutyl sebacate and 0.16 gram (0.4%) of triethanolamine. These materials were thoroughly mixed and ground to a fine, dry powder in a ball mill. Samples of the mixture and of an identically-prepared mixture except that no triethanolamine was mixed therewith were spread out on watch glasses and treated at 170° C. for 18 hours. At the end of this period the mixture, containing the triethanolamine, was only slightly yellow, while that from which the triethanolamine was absent was a deep, golden brown color.

The stabilizing effect of the triethanolamine was further substantiated by measuring the pH of solutions prepared from the forementioned cellulose acetate butyrate mixture before and after heating 18 hours at 170° C. Solutions were made of 2000 grams of material in 10 cc. of acetone and 10 cc. of 95% ethanol. The pH of these solutions was measured electrometrically with a glass electrode Beckman acidimeter. The following results were obtained:

|  | pH before heating 18 hours at 170° C. | After heating | Difference |
|---|---|---|---|
| Cellulose acetate butyrate and dibutyl sebacate | 6.3 | 4.0 | 2.3 |
| Same with 0.4% triethanolamine | 7.1 | 5.8 | 1.3 |

*Example II*

A composition was prepared in the same way as in Example I consisting of 28 parts of cellulose tributyrate containing a magnesium residue, 12 parts of dibutyl sebacate and 0.16 part of triethanolamine. Upon heating this composition at 170° C. for 18 hours it was found that the amount of discoloration was considerably less than that obtained with a similarly heated mixture containing no triethanolamine.

*Example III*

A composition was prepared in the same manner as in the preceding examples with 28 parts of low viscosity cellulose tributyrate containing a magnesium residue, 12 parts of dibutyl sebacate and .18 part of tri-iso-propanolamine. The tri-iso-propanolamine was found to be almost as effective as triethanolamine in preventing discoloration by heat.

*Example IV*

A melt-coating composition was prepared by slowly stirring 8.4 pounds of low viscosity cellulose acetate butyrate of 14.2% acetyl and 40% butyryl containing a magnesium residue into 3.6 pounds of diamyl phthalate kept at a temperature of 150-160° C. 22 grams of triethanolamine was also stirred into the mixture. The mixture, even though stirred for several hours, remained a smooth, light-colored melt of moderate viscosity. This composition was found to be satisfactory for coating surfaces in molten form as described in our application Serial No. 275,484.

*Example V*

A composition suitable for thermoplastic molding was prepared essentially consisting of 100 parts of cellulose acetate butyrate having a butyryl content of 37% and containing a magnesium residue, 14 parts of dibutyl sebacate and 0.2 part of α-methyl amino glycerol. The composition was prepared by first grinding the cellulose acetate butyrate and pressing the ground material through a 28 mesh screen followed by thoroughly mixing with the plasticizer and the stabilizing agent. The well-mixed material was worked on a hot roll as is usual in the trade. The resulting product was found to be resistant to discoloration at elevated temperatures and was suitable for granulation into a molding composition.

We claim:

1. A heat-resistant composition comprising a cellulose ester having a butyryl content of at least 25%, which ester has a residue selected from the group consisting of magnesium, calcium, strontium and barium and is free of alkali metal residue, and 0.1-1% of an alcohol amine selected from the group consisting of tri-ethanolamine, tri-iso-propanolamine, 2-amino-2-methyl-1-propanol, 2-amino-2-methyl 1,3 propanediol, the diethanolamines and the glycerolamines.

2. A heat-resistant composition comprising a cellulose ester having a butyryl content of at least 25%, which ester has a magnesium residue and is free of alkali metal residue, and 0.1-1% of an alcohol amine selected from the group consisting of tri-ethanolamine, tri-iso-propanolamine, 2-amino-2-methyl-1-propanol, 2-amino-2-methyl 1,3 propanediol, the diethanolamines and the glycerolamines.

3. A heat-resistant composition comprising a cellulose ester having a butyryl content of at least 25%, which ester has a calcium residue and is free of alkali metal residue, and 0.1-1% of an alcohol amine selected from the group consisting of triethanolamine, tri-iso-propanolamine, 2 - amino - 2 - methyl - 1 - propanol, 2-amino-2-1,3 propanediol, the diethanolamines and the glycerolamines.

4. A heat-resistant composition comprising a cellulose ester having a butyryl content of at least 25%, which ester has a magnesium residue and is free of alkali metal residue, and 0.1-1% of triethanolamine.

5. A heat-resistant composition comprising a cellulose acetate butyrate having a butyryl content of approximately 37%, which ester contains a magnesium residue and is free of alkali metal residue, and 0.1-1% of an alcohol amine selected from the group consisting of triethanolamine, tri - iso - propanolamine, 2 - amino - 2 - methyl-1-propanol, 2-amino-2-methyl 1,3 propanediol, the diethanolamines and the glycerolamines.

6. A heat-resistant composition comprising a cellulose tributyrate, which ester has a magnesium residue and is free of alkali metal residue, and 0.1-1% of an alcohol amine selected from the group consisting of triethanolamine, tri-iso-propanolamine, 2 - amino-2-methyl-1-propanol, 2-amino-2-methyl 1,3 propanediol, the diethanolamines and the glycerolamines.

7. A heat-resistant composition comprising a cellulose ester having a butyryl content of at least 25%, which ester has a magnesium residue and is free of alkali metal residue, which composition also contains plasticizer and 0.1-1% of triethanolamine.

8. A method of applying a protective coating to a surface which comprises depositing upon that surface in molten condition a low-melting composition essentially consists of a cellulose ester having a butyryl content of at least 25%, which ester has a magnesium residue and is free of alkali metal residue, 5-50% (based on the weight of the cellulose ester) of a stable, compatible, high molecular weight plasticizer and 0.1-1% of an alcohol amine selected from the group consisting of triethanolamine, tri-isopropanolamine, 2-amino-2-methyl-1-propanol, 2-amino-2-methyl 1,3 propanediol, the diethanolamines and the glycerolamines at a temperature of approximately the melting point of the cellulose ester whereby an article is obtained having a protective coating thereon which is firm, moisture-resistant and strongly adherent at atmospheric temperatures.

9. A method of applying a protective coating to a surface which comprises depositing on that surface in molten condition a low melting composition essentially consisting of a cellulose tributyrate, which ester has a magnesium residue and is free of alkali metal residue, 5-50% (based on the weight of the cellulose ester) of a stable, compatible, high molecular weight plasticizer and 0.1-1% of an alcohol amine selected from the group consisting of triethanolamine, tri-iso- propanolamine, 2 - amino - 2 - methyl-1-propanol, 2-amino-2-methyl 1,3 propanediol, the diethanolamines and the glycerolamines at a temperature of approximately the melting point of the cellulose ester whereby an article is obtained having a protective coating thereon which is firm, moisture-resistant and strongly adherent at atmospheric temperatures.

10. A method of preparing a cellulose ester composition resistant to the effect of an elevated temperature which comprises preparing a cellulose ester having a butyryl content of at least 25% employing a sulfuric acid catalyst, neutralizing the catalyst with an alkaline magnesium compound only and thoroughly mixing the cellulose ester thus obtained with 0.1-1% of triethanolamine.

CARL J. MALM.
MARTIN SALO.

CERTIFICATE OF CORRECTION.

Patent No. 2,371,768.                                    March 20, 1945.

CARL J. MALM, ET AL.

It is hereby certified that error appears in the printed specification of the above numbered patent requiring correction as follows: Page 3, first column, line 33, claim 3, for "2-amino-2-" second occurrence, read --2-amino-2-methyl--; and that the said Letters Patent should be read with this correction therein that the same may conform to the record of the case in the Patent Office.

Signed and sealed this 2nd day of October, A. D. 1945.

Leslie Frazer

(Seal)                            First Assistant Commissioner of Patents.